United States Patent [19]

Quimby

[11] Patent Number: 5,106,340
[45] Date of Patent: Apr. 21, 1992

[54] PORTABLE FIELD THRASHER

[75] Inventor: E. Dean Quimby, Larned, Kans.

[73] Assignees: Ronald J. Quimby, Larned, Kans.; Gene D. Quimby, Garber; Delmar R. Quimby, Oswasso, both of Okla.

[21] Appl. No.: 636,716

[22] Filed: Jan. 2, 1991

Related U.S. Application Data

[63] Continuation-in-part of Ser. No. 535,577, Jun. 11, 1990, Pat. No. 5,041,058.

[51] Int. Cl.⁵ ............................................. A01F 5/00
[52] U.S. Cl. .................................... 460/61; 56/16.5; 56/239
[58] Field of Search ............... 460/61, 24, 45, 96, 460/901, 64, 65; 56/16.4, 16.5, 126, 219, 222, 239

[56] References Cited

U.S. PATENT DOCUMENTS

| | | |
|---|---|---|
| 739,908 | 9/1903 | Nightingale. |
| 1,910,357 | 5/1933 | Nye. |
| 2,399,718 | 5/1946 | Baker et al.. |
| 4,121,779 | 10/1978 | Mills et al. ............... 241/79.2 |
| 4,337,782 | 7/1982 | Da Silva ..................... 460/64 |
| 4,417,593 | 11/1983 | Brehon ....................... 460/73 |
| 4,724,632 | 2/1988 | Bilsland et al. ............ 460/61 |

Primary Examiner—Terry Lee Melius
Attorney, Agent, or Firm—Litman, McMahon & Brown

[57] ABSTRACT

A field thrasher includes a housing assembly and a thrashing assembly. The housing assembly includes an upper thrashing enclosure with a mouth opening and a chaffe discharge opening. A lower, collection enclosure is mounted below the thrashing enclosure and includes a grain discharge opening, an air discharge opening and a chaffe discharge opening. A spout is mounted on the thrashing enclosure in communication with the mouth opening. The thrashing assembly includes a flail subassembly comprising a rotor shaft rotatably mounted in the thrashing enclosure and tines extending outwardly from the rotor shaft. A drive subassembly includes a motor drivingly coupled to the rotor shaft and mounted on top of the thrashing enclosure. A fan subassembly is mounted in a fan compartment at an upper end of the thrashing enclosure and provides an airflow through the housing.

19 Claims, 2 Drawing Sheets

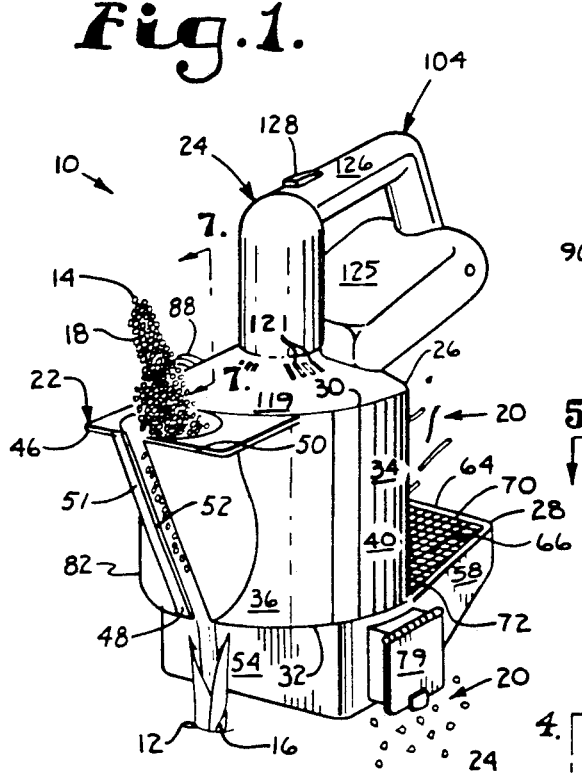

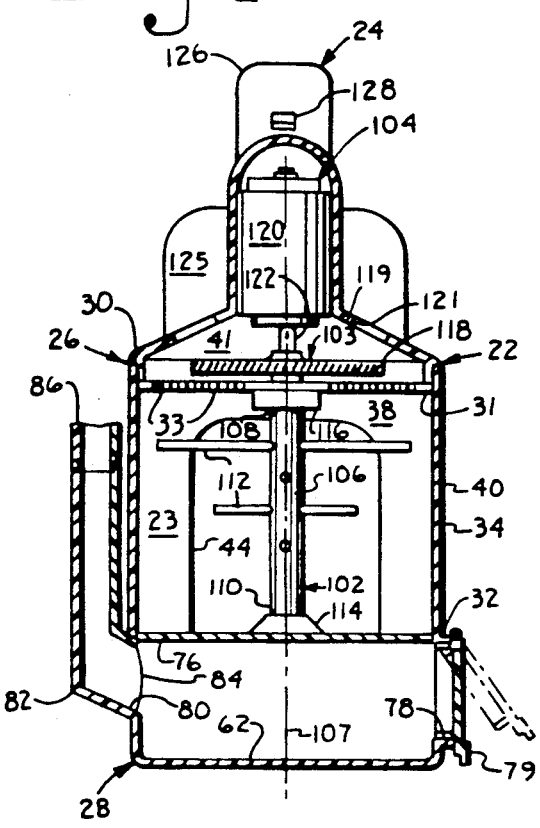
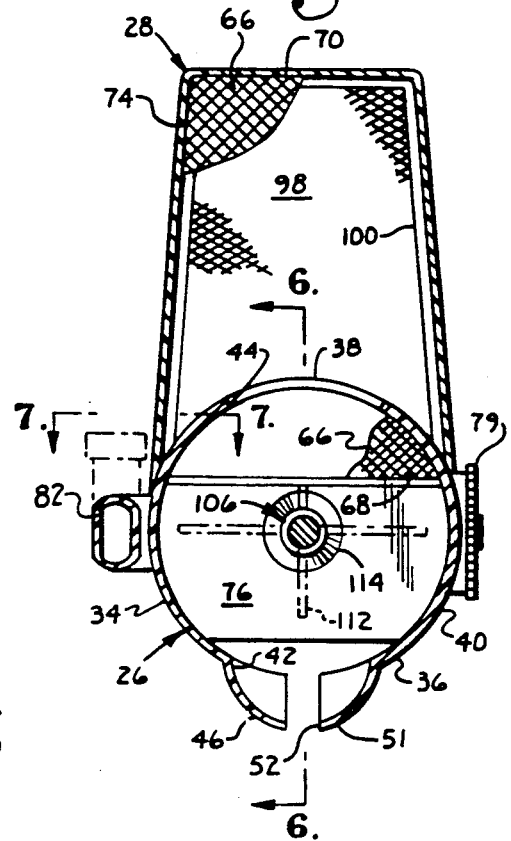
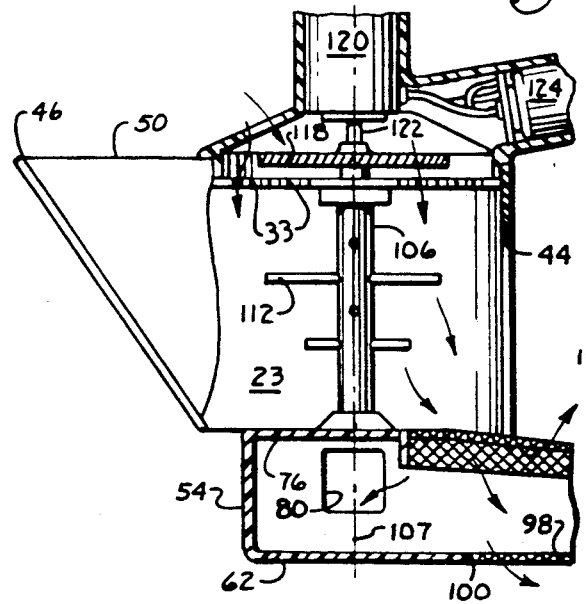
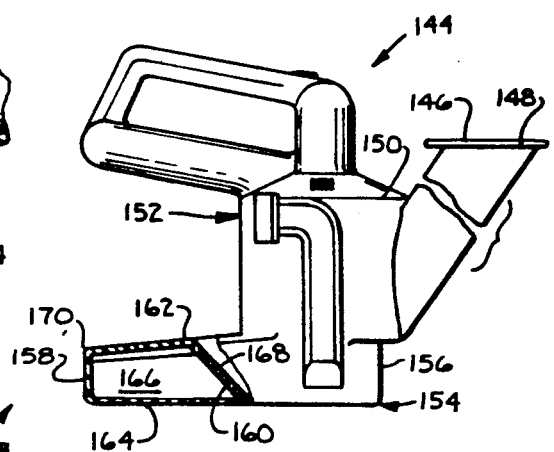

PORTABLE FIELD THRASHER

CROSS REFERENCE TO RELATED APPLICATION

This application is a continuation-in-part of U.S. patent application Ser. No. 535,577 filed June 11, 1990 now U.S. Pat. No. 5,041,058 for PORTABLE THRASHER.

BACKGROUND OF THE INVENTION

1. Field of the Invention

The present invention relates generally to crop harvesting and more particularly to a field thrasher for grain sampling.

2. Description of the Related Art

Various thrashers have heretofore been devised for harvesting crop plants. Thrashers designed for normal harvesting operations can be relatively large, complicated and expensive. These characteristics are often necessary to achieve the objectives of a normal field harvesting operation, i.e., maximizing the crop yield in the shortest possible time with the lowest possible labor and fuel requirements.

Proper harvest timing can be important to maximize crop yields and also to obtain the best possible prices for the harvested crops. One timing factor involves crop moisture contents, which can vary considerably over relatively short periods of time as the crops are exposed to precipitation and the drying effects of sun and wind. Harvesting a crop in a wet condition can result in a lower price being paid for it. Crop buyers, such as cooperatives and grain elevators, often discount or "dock" grain prices for excessive moisture content because moisture can cause problems of spoilage and heat buildup in the stored grain.

Relatively "wet" grain may require drying and/or mixing with drier grain for marketability. Grain buyers often compensate for these problems and extra processing costs by "docking" grain sellers for damp grain.

Crop moisture conditions in the fields can change significantly in a few hours; for example, a heavy dew may cover a field early in the morning, and then substantially evaporate a few hours later. Thus, properly timing a grain harvest often involves timing within a matter of hours. Without hydrometers and other sophisticated equipment for determining moisture content, farmers and harvest workers often make estimates based upon their personal observations. However, such empirical measuring and sampling methods can be relatively imprecise.

As an alternative, harvesting equipment can be advanced into a field for a crop sample, which can then be analyzed for moisture content. However, much of the equipment designed for large scale field harvesting work is not particularly well suited for cutting and thrashing small samples, particularly moisture content analysis samples which generally require only a handful (e.g., about 250 grams or less) of grain. Some full-size equipment, therefore, tends to be wasteful when used for sampling since it thrashes considerably more grain than is needed for analysis purposes. Furthermore, transportation problems can be encountered with relatively large harvesting equipment, particularly when samples are needed from fields which are distant from each other. When remote fields are to be harvested, transporting large thrashers and combines to various distant locations can be expensive and inefficient when only small grain samples are needed.

A solution to some of these problems is to provide a portable thrasher, which can easily be transported from place to place and which is adapted for retrieving relatively small grain samples for moisture content analysis purposes. Such a thrasher is shown in the Brehon U.S. Pat. No. 4,417,593, and utilizes a beater and a fan system for thrashing grain both mechanically and pneumatically. However, the air handling system of the Brehon thrasher contributes substantially to its bulk, and it would be desirable to provide a more compact unit which can easily be carried by an individual. Furthermore, the Brehon thrasher is configured for feeding the grain heads downwardly into a conduit opening at the top of the thrasher, which might add the additional operational step of cutting the grain stalks prior to thrashing.

The present invention addresses some of these problems by providing a relatively compact thrasher which is adapted for gathering grain and other crop samples as they are found in the field.

SUMMARY OF THE INVENTION

In the practice of the present invention, a field thrasher is provided which includes a housing assembly with an interior having a thrashing enclosure and a collection enclosure. A feeding spout is mounted on a front of the housing assembly thrashing enclosure and communicates with an intake opening to the housing interior. A thrashing assembly is mounted in the thrashing enclosure and includes a flail subassembly rotatably mounted in the thrashing enclosure and a drive subassembly mounted on the housing subassembly and drivingly connected to the flail subassembly. A fan rotates with the flail subassembly and forces an air flow through the housing assembly to facilitate the thrashing operation. An exhaust duct is provided for exhausting air from the collection enclosure. Thrashed grain can be discharged from the collection enclosure through a grain discharge opening.

OBJECTS AND ADVANTAGES OF THE INVENTION

The principal objects and advantages of the present invention include: providing a field thrasher; providing such a thrasher which is portable; providing such a thrasher which is suited for a variety of crop plants; providing such a thrasher which, in different embodiments, can be configured for different crop plants; providing such a thrasher which effectively separates edible plant portions from inedible or "chaffe" portions; providing such a thrasher which utilizes pneumatic and mechanical action to thrash; providing such a thrasher which utilizes a relatively simple, rotary flail mechanism; providing such a thrasher which utilizes a fan to facilitate the discharge of chaffe and fines; providing such a thrasher which can be driven by an electric motor coupled to a rechargeable battery; providing such a thrasher which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a field thrasher embodying the present invention, shown in the process of thrashing a head of milo.

FIG. 2 is a front elevational view thereof.

FIG. 3 is a left side elevational view thereof.

FIG. 4 is a vertical, transverse cross-sectional view thereof, taken generally along line 4—4 in FIG. 3.

FIG. 5 is a horizontal, cross-sectional view thereof, taken generally along line 5—5 in FIG. 2.

FIG. 6 is a fragmentary, vertical cross-sectional view thereof, taken generally along line 6—6 in FIG. 5.

FIG. 7 is a fragmentary, rear elevational view thereof, taken generally along line 7—7 in FIG. 1 and particularly showing a discharge duct outlet valve.

FIG. 8 is a right side elevational view of a portable thrasher comprising a first modified or alternative embodiment of the present invention, which is particularly adapted for thrashing wheat.

DETAILED DESCRIPTION OF THE INVENTION

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 10 generally designates a thrasher embodying the present invention. Without limitation on the generality of useful applications of the thrasher (or "thresher") 10, it can be used for thrashing crop plants 12, each plant 12 including a head 14 supported by a stem or stalk 16. The head 14 generally comprises the edible grain or other food portions 18 (i.e. beans, seeds, kernels, etc.). The plant 12 includes inedible portions comprising the stalk 16 and portions of the head 14, which are generally referred to as chaffe 20.

The thrasher 10 generally comprises a housing assembly 22 with an interior 23 and a thrashing assembly 24.

II. Housing Assembly 22

The housing assembly 22 generally comprises a thrashing enclosure 26 and a collection enclosure 28.

The thrashing enclosure 26 includes upper and lower ends 30, 32, a generally cylindrical wall 34, a front 36, a back 38 and opposite sides 40. A fan compartment 41 is located at the thrashing enclosure upper end 30 under a fan compartment cover 119 with slots or openings 121. An intake opening 42 is formed in the thrashing enclosure front 36 and a chaffe discharge opening 44 is formed in the thrashing enclosure back 38. A perforated thrashing enclosure top panel 31 is mounted in the thrashing enclosure upper end 30 and includes air passages 33.

A feeding spout 46 is mounted on the front 36 and includes a lower end 48 communicating with the intake opening 42 and a flanged upper end 50. The feeding spout 46 includes a front face 51 with a slot 52 extending between its ends 48, 50. The feeding spout 46 is shaped somewhat like a portion of a funnel or a tube.

The collection enclosure 28 includes a front wall 54, a back wall 56, a first or left sidewall 58, a second or right sidewall 60, a floor or bottom 62, and an open top 64.

A screen 66 is mounted in the open top 64 and includes a front edge 68, a back edge 70, a first (left) side edge 72 and a second (right) side edge 74. The collection enclosure 28 includes a front cover 76 extending between the side walls 58, 60 and extending rearwardly from the front wall 54 to the screen front edge 68. The first/left sidewall 58 includes a grain discharge opening 78 and the second/right sidewall 60 includes an air discharge opening 80.

An exhaust duct 82 extends alongside the housing assembly 22 and includes a lower, inlet end 84 communicating with the air discharge opening 80 and an upper, outlet end 86. A valve 88 is mounted on the outlet end 86 and includes a first, fixed valve disk 90 with openings 92 fixedly mounted on the duct outlet end 86 and a second valve disk 94 with openings 96 rotatably mounted on the first valve disk 90 whereby the openings 92, 96 can be selectively, partially or completely aligned for adjusting the air openings formed thereby in the valve 88 from completely closed to completely open, with all of the openings 92, 96 being substantially completely aligned in the fully open position for maximum air flow through the duct 82.

A bottom screen 98 is mounted in a bottom opening 100 of the collection enclosure floor 62.

III. Thrashing Assembly 24

The thrashing assembly 24 generally includes a flail subassembly or means 102, a fan subassembly or means 103 and a drive subassembly or means 104.

The flail subassembly 102 includes a rotor shaft 106 with upper and lower ends 108, 110 and a plurality of tines 112 projecting laterally therefrom. The rotor shaft 106 is rotatable about and coaxial with a rotational axis 107. The number and length of tines 112 can vary according to various operational factors and considerations such as the nature of the crops to be thrashed, speed and power of the drive subassembly 104, and the desired output of the thrasher 10.

The rotor shaft lower end 110 is rotatably journaled in a lower bearing 114 on the front cover 76 and the rotor shaft upper end 108 is rotatably journaled in an upper bearing 116 mounted on the thrashing enclosure top panel 31.

The fan subassembly 103 includes a rotating fan (e.g., squirrelcage, bladed, etc.) rotatably mounted in the fan compartment 41 under the fan compartment cover 119. The drive subassembly 104 includes an electric motor 120 mounted on top of the fan compartment 41 and coupled to the fan 118 and the rotor shaft upper end 108 by a drive shaft 122. The electric motor 120 can be selectively coupled to a suitable electrical power source such as (e.g., nickel cadmium) batteries 124 mounted in a battery compartment 125 connected to the housing assembly 22. An on/off switch 128 can be mounted in a handle 126 for convenient access by an operator's thumb and can be selectively coupled to the electric motor 120 and the batteries 124.

The drive subassembly 104 can comprise, for example, a drive unit of the type which is commonly used on flexible line vegetation trimmers. Alternatively, other prime movers or drive means could be employed, e.g., a gasoline engine or a hand crank. A tractor-mounted embodiment of the present invention could be coupled to the power takeoff unit of a tractor.

IV. Operation

The thrasher 10 can be sized for convenient carrying into a field by an operator and for relatively convenient transportation in a normal passenger vehicle or pickup truck. The crop plants 12 can be thrashed with the thrasher 10 for sampling purposes in the field. The thrasher 10 can be guided by an operator towards a crop plant 12 so that its stem or stalk 16 enters the feeding spout slot 52 with the head 14 positioned generally above the feeding spout upper end 50. The thrasher 10 can then be guided generally upwardly and forwardly whereby the head 14 is guided downwardly and rearwardly through the feeding spout 46 and into engagement with the flail subassembly 102.

The drive assembly 104 can be activated (e.g., by pressing the switch 128) prior to engaging the crop plant 12. The head 14 preferably engages the rotating tines 112 whereby grain 18 (e.g., seeds, beans, kernels etc.) are thrashed from the head 14. The tines 112 tend to propel some of the lighter chaffe material 20 rearwardly through the discharge opening 44, whereas the grain 18, which can be heavier than the chaffe 20, tends to drop through the thrashing enclosure 26 and into the collection enclosure 28.

Further grain 18/chaffe 20 separation can occur in the collection enclosure 28. For example, relatively lightweight fines can fall or be blown through the bottom screen 98, propelled by a generally downward air flow from the fan subassembly 103. The air flow can also blow fines out of the collection enclosure 28 through the upper collection enclosure screen 66 and through the exhaust duct 82. The air flow through the exhaust duct 82 can be controlled with the valve 88.

For sampling operations, e.g., to test the moisture content in a relatively small sample of grain 18, the loss of a certain amount of grain discharged from the thrasher 10 during the thrashing operation may be relatively insignificant, particularly if the grain 18 collected in the collection enclosure 28 is relatively free of chaffe 20 and fines. The percentage or degree of separation of grain 18 from chaffe 20 and fines can be controlled by varying the geometries of the housing assembly 22, the sizes and locations of the openings and screens 42, 44, 66, 80, 100, etc. By adjusting these various factors, and others such as the operational rotational speed of the flail subassembly 102 and the size, spacing, number and stiffness of the tines 112, the thrashing or separation characteristics of the thrasher 10 in operation can be varied to achieve desired performance characteristics with various crop plants 12 under various field conditions. Substantial advantages occur from employing the field thrasher 10, such as the ability to sample crops for moisture content analysis in a number of fields which can be remote from each other, and the avoidance of "dockage" grain price reduction at feed mills due to excessive moisture content in prematurely harvested grain.

When a desired amount of grain 18 has been accumulated in the collection enclosure 28, it can be discharged by opening a cover panel 79 over the grain discharge opening 78 and the grain 18 can be poured through the discharge opening 78 by tilting the thrasher 10 to one side.

V. Modified or Alternative Embodiment Thrasher 144

A field thrasher 44 comprising a modified or alternative embodiment of the present invention is shown in FIG. 8 and includes an extended feeding spout 146. The feeding spout 146 terminates at an upper end 148 which can be positioned generally above an upper end 150 of a thrashing enclosure 152. The field thrasher 144 also includes a collection enclosure 154 with front and back ends 156, 158 and an intermediate divider wall 160 which slopes downwardly-and-forwardly from a collection enclosure top 162 to a collection enclosure bottom 164. A hollow void or cavity 166 is thus formed between the collection enclosure back end 158 and the divider wall 160, with a collection compartment 168 being formed between the collection enclosure front end 156 and the divider wall 160.

For certain types of crops, such as wheat, a smaller collection compartment, such as that shown at 168, may be appropriate. The hollow void or cavity 166 is located in an extension 170 of the collection enclosure 154 which stabilize the thrasher 144 when it is resting on a flat surface. The collection enclosure top 162 can be open over the collection compartment 168, closed over the extension 170, and closed on the bottom 164 as shown in FIG. 8. Alternatively, screens, such as those shown at 66 and 98 in the thrasher 10, could be provided.

The relatively long feeding spout 146 of the thrasher 144 and the shorter collection compartment 168 can facilitate thrashing certain crops, such as wheat, barley, oats, rye, etc.

Thrashers embodying the present invention could be specifically configured for various crops using components disclosed herein with appropriate sizes and configurations. The thrashers 10 and 144 disclosed herein can each be used to thrash a number of different crops. With the thrashers 10 and 144 disclosed herein, it is anticipated that a relatively wide variety of crops could be thrashed.

It is to be understood that while certain forms of the present invention have been illustrated and described herein, it is not to be limited to the specific forms or arrangement of parts described and shown.

What is claimed and desired to be secured by Letters Patent is as follows:

1. A thrasher, which includes:
   (a) a housing, which includes:
      (1) a housing interior;
      (2) a month opening to said housing interior;
      (3) a grain discharge opening to said housing interior; and
      (4) a chaffe discharge opening to said housing interior;
   (b) a thrashing assembly, which includes:

(1) a rotatable flail subassembly, proximate said chaffe discharge opening, rotatably mounted in said housing interior and including a rotational axis and tine means; and (2) drive means drivingly connected to said flail subassembly;

(c) said thrashing assembly including means for discharging chaffe through said chaffe discharge opening; and (d) a feeding spout mounted on said housing and including a proximate, lower end communicating with said housing mouth opening and a distal, upper end with an inlet opening.

2. The invention of claim 1 wherein said housing includes:

(a) a front wall with said mouth opening and a rear wall with said chaffe discharge opening.

3. The invention of claim 1 wherein said housing includes:

(a) an upper, thrashing enclosure with said flail subassembly located therein and a lower, collection enclosure.

4. The invention of claim 3 which includes screen means separating said housing upper and lower enclosures.

5. The invention of claim 1 wherein:

(a) said grain discharge opening is selectively open into said collection enclosure.

6. The invention of claim 1 wherein:

(a) said drive means is mounted on top of said thrashing enclosure and comprises an electric motor.

7. The invention of claim 6, which includes:

(a) a handle connected to said housing; and (b) battery means mounted in said handle and electrically coupled to said motor.

8. The invention of claim 6, which includes:

(a) fan means associated with said motor for providing an air flow through said thrashing enclosure.

9. The invention of claim 1, which includes:

(a) exhaust air duct means with an inlet end communicating with said collection enclosure and an outlet end.

10. The invention of claim 9, which includes:

(a) exhaust duct valve means mounted on said exhaust duct discharge end.

11. A thrasher, which comprises:

(a) a housing, which includes:

(1) a housing interior;

(2) a generally cylindrical thrashing enclosure with a front having a mouth opening, a back having chaffe discharge opening, an upper end, a lower end and a top panel with a plurality of air passages;

(3) a collection enclosure including a front end, a back end, a bottom, a top with an opening communicating with said thrashing enclosure, a front cover on the collection enclosure top, a first sidewall with a grain discharge opening and a second sidewall with an air discharge opening;

(4) a grain discharge opening cover selectively covering said grain discharging opening;

(5) a feeding spout including an upper, distal, open end and a lower, proximate open end communicating with said mouth opening and connected to said thrashing enclosure front ;

(6) an air discharge duct including a lower end communicating with said collection enclosure air discharge opening and an upper end;

(7) an exhaust duct valve mounted on said exhaust duct discharge opening and including a first disk mounted on said exhaust duct discharge end and having an opening, a second disk rotatably mounted on said exhaust duct discharge end and having an opening and means for selectively aligning said openings of said first and second disks;

(8) a fan compartment located above said thrashing enclosure top panel; and (9) a fan compartment cover with air intake slots mounted on top of the thrashing enclosure upper end over the fan compartment;

(b) a thrashing assembly which includes:

(1) a rotatable flail subassembly rotatably mounted in said housing interior and including:

(i) a rotor shaft with upper and lower ends;

(ii) a lower bearing mounted on said collection enclosure front cover with said rotor shaft lower end journaled therein;

(iii) an upper bearing mounted on said thrashing enclosure top panel and having said rotor shaft upper end rotatably journaled therein;

(iv) a plurality of tines mounted on and extending radially outwardly from said rotor shaft; and (v) a generally vertical rotational axis extending coaxially with said rotor shaft;

(2) a drive subassembly including an electric motor mounted on said housing above said fan compartment and including a drive shaft drivingly coupled to said rotor shaft upper end, a handle mounted on said housing adjacent to said thrashing enclosure upper end, a battery compartment connected to said handle and to said housing, an electrical storage battery mounted in said battery compartment, an electrical switch mounted on said handle and having an open position with said battery and said electric motor electrically uncoupled and a closed position with said electric motor and said battery electrically coupled; and (3) a fan connected to said electric motor drive shaft and said rotor shaft, said fan being rotatable about said rotational axis in said fan compartment.

12. The invention of claim 11, which includes screen means separating said thrashing and collection enclosures and covering said collection enclosure top opening.

13. The invention of claim 12, which includes:

(a) a bottom, chaffe discharge opening in said collection enclosure bottom; and (b) screen means covering said bottom, chaffe discharge opening.

14. The invention of claim 11, wherein said collection enclosure includes:

(a) a divider wall intermediate said front and back ends; and (b) a collection compartment between said divider wall and said collection enclosure front end.

15. The invention of claim 14, wherein said collection enclosure includes:

(a) said collection wall sloping downwardly-and-forwardly; and (b) a hollow void between said divider wall and said collection enclosure back end.

16. A thrasher, which includes:

(a) a housing, which includes:
   (1) a housing interior;
   (2) a mouth opening to said housing interior;
   (3) a grain discharge opening to said housing interior; and
   (4) a chaffe discharge opening to said housing interior;
(b) a thrashing assembly, which includes:
   (1) a rotatable flail subassembly rotatably mounted in said housing interior and including a rotational axis and tine means; and
   (2) drive means drivingly connected to said flail subassembly;
(c) said housing including a front wall with said mouth opening and a rear wall with said chaffe discharge opening; and
(d) a feeding spout mounted on said housing front wall in communication with said mouth opening, said feeding spout including:
   (1) a proximate, lower end attached to said housing front wall;
   (2) a distal upper end; and
   (3) a front face including a slot extending between said spout ends.

17. A thrasher, which includes:
(a) a housing, which includes:
   (1) a housing interior;
   (2) a mouth opening to said housing interior;
   (3) a grain discharge opening to said housing interior; and
   (4) a chaffe discharge opening to said housing interior;
(b) a thrashing assembly, which includes:
   (1) a rotatable flail subassembly rotatably mounted in said housing interior and including a rotational axis and tine means; and
   (2) drive means drivingly connected to said flail subassembly;
(c) said housing including an upper, thrashing enclosure with said flail subassembly located therein and a lower, collection enclosure;
(d) screen means separating said housing upper and lower enclosures; and
(e) said collection enclosure including:
   (1) front and back ends;
   (2) a divider wall intermediate said front and back end; and
   (3) a collection compartment between said divider wall and said collection enclosure front end.

18. The invention of claim 17 wherein said collection enclosure includes:
(a) said divider wall sloping downwardly-and-forwardly; and
(b) a hollow void between said divider wall and said collection enclosure back end.

19. A thrasher, which includes:
(a) a housing, which includes:
   (1) a housing interior;
   (2) a mouth opening to said housing interior;
   (3) a grain discharge opening to said housing interior; and
   (4) a chaffe discharge opening to said housing interior;
(b) a thrashing assembly, which includes:
   (1) a rotatable flail subassembly rotatably mounted in said housing interior and including a rotational axis and tine means; and
   (2) drive means drivingly connected to said flail subassembly;
(c) exhaust air duct means with an inlet end communicating with said collection enclosure and an outlet end; and
(d) exhaust duct valve means mounted on said exhaust duct discharge end, said exhaust duct valve means comprising:
   (1) a first disk mounted on said exhaust duct discharge end and having an opening;
   (2) a second disk rotatably mounted on said exhaust duct discharge end and having an opening; and
   (3) means for selectively aligning said openings of said first and second disks.

* * * * *